United States Patent [19]

Kuriiwa

[11] Patent Number: 5,042,358
[45] Date of Patent: Aug. 27, 1991

[54] OCEAN LAUNCHING APPARATUS OF SPACE ROCKET

[75] Inventor: Tsuneaki Kuriiwa, Chiba, Japan

[73] Assignees: Sankyu Inc.; Mitsubishi Jukogyo Kabushiki Kaisha, Tokyo, Japan

[21] Appl. No.: 515,042

[22] Filed: Apr. 26, 1990

[30] Foreign Application Priority Data

Apr. 28, 1989 [JP] Japan .................................. 1-110692

[51] Int. Cl.$^5$ ........................ B63B 35/40; F41F 3/042
[52] U.S. Cl. ...................................... 89/1.8; 89/1.815; 114/259; 405/209
[58] Field of Search ................ 405/209; 114/259, 258, 114/61; 89/1,811.802, 1.815

[56] References Cited

U.S. PATENT DOCUMENTS

| | | | |
|---|---|---|---|
| 4,312,287 | 1/1982 | Kuo | 114/259 |
| 4,747,334 | 5/1988 | Kuriiwa | 89/1.802 |
| 4,848,967 | 7/1989 | Weyler | 405/209 |
| 4,916,999 | 4/1990 | Palmer et al. | 89/1.815 |

Primary Examiner—David H. Brown
Attorney, Agent, or Firm—Venable, Baetjer, Howard & Civiletti

[57] ABSTRACT

A movable ocean launching apparatus includes a semi-submersible ocean launcher for space rockets and a carrier for carrying it while holding the upper supporting deck thereof. This arragement makes it possible to inexpensively realize the transporation of the ocean launcher, preparation for ocean-based launching and the like and also to reduce the total construction costs of the launching base.

21 Claims, 6 Drawing Sheets

F I G. 3
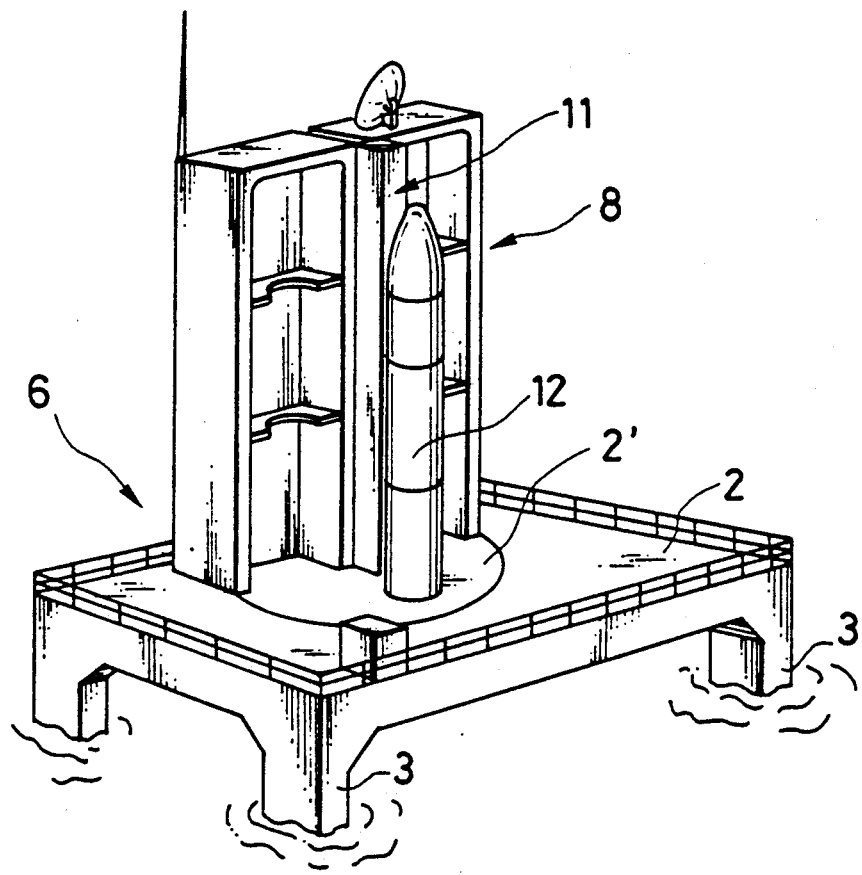

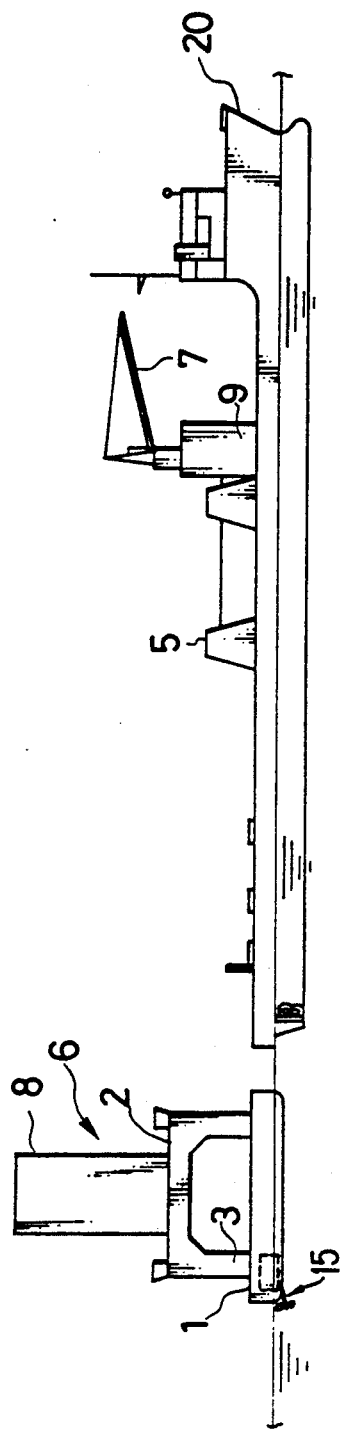
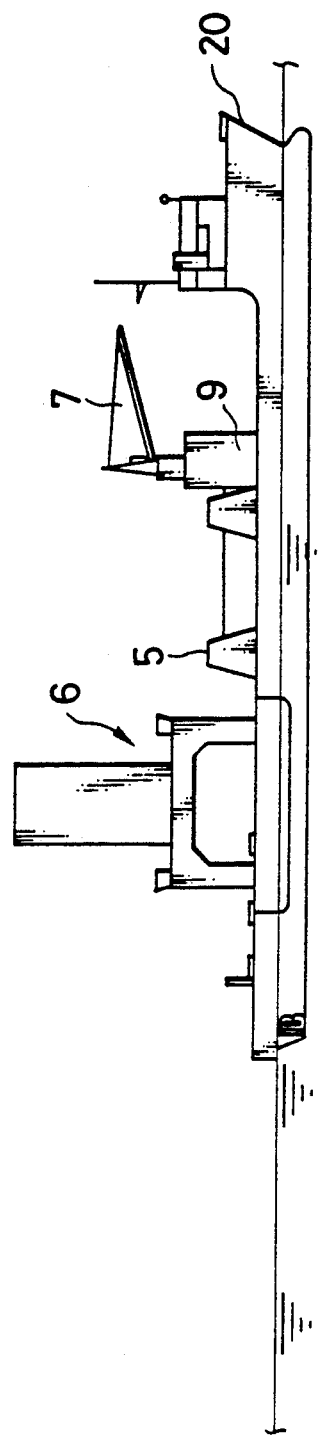

OCEAN LAUNCHING APPARATUS OF SPACE ROCKET

BACKGROUND OF THE INVENTION

1. Field of the Invention

The present invention relates to a movable ocean launching apparatus which is capable of launching a space rocket at an optimum location on the ocean.

2. Description of the Related Art

The idea of launching a space rocket on the ocean is never novel apart from missile launching from a ship. However, at present, there is no practical means other than a launcher which utilizes a scaffold of a jack-up platform type whose leg is fixed at the bottom of the ocean. If the space-rocket launcher of the jack-up platform type is to be installed in the ocean, in case the depth of water at a launching site is greater than the length of the leg of a jack, it is impossible to install the space-rocket launcher. The space-rocket launcher cannot necessarily be installed at an optimum location and it follows that space rockets may not always be launched in optimum conditions. For example, it is impossible to launch space rockets on international waters having great depth of water, particularly international waters near or under the equator which are suitable for the launching of space rockets. As described above, the space-rocket launcher of the conventional jack-up platform type has the disadvantage that the range of freedom to select a launching site is extremely limited, and it is impossible to satisfactorily utilize various advantages of ocean launching.

For these reasons, the desired form of ocean launcher for space rockets is of a float type. However, when the oscillation of a hull body due to waves is considered, such a float type of ocean launcher for space rockets is not suitable for combination with a so-called ordinary ship, and there is no choice but to use a semi-submersible type of space-rocket launcher in which the oscillation of its hull due to waves can be minimized. Various proposals have been made with respect to the idea of such a semi-submersible launcher for space rockets, but none of the proposals is realized. It is conceived that the primary reason is that all the conventional proposals have been directed to only the arrangement of a launcher without taking into account a method of carrying out a series of heavy operations or the facilities and equipment required to implement the method. The heavy operations involve, for example, the step of carrying a launcher from a factory to an optimum launching site on the ocean and the step of carrying a space rocket to be launched from the factory to the launcher installed at the optimum launching site, or the problems of how to load, if the waves are high, the space rocket onto the launcher which has been carried over the ocean, and of how to launch the space rocket in such an unfavorable condition.

Even if a space rocket can be successfully launched, it will scatter noise and smoke around. In addition, since the space rocket which completes predetermined tasks fall onto an unspecified place, an extremely wide area around the launching site must be designated as a restricted area. It will therefore be natural that the launching of space rockets be called a kind of process for producing environmental destruction. If the launching of a space rocket should fail, a number of serious dangers will be encountered; for example, the space rocket is likely to explode or deviate from the trajectory. In such a case, it is necessary to destruct the failed space rocket. For these reasons, a vast control area is required for the launching of a space rocket.

Fortunately, the launching of space rockets in Japan has not yet encountered a serious failure and no substantial problem has been presented except for dangers which may occur when a space rocket falls down after the completion of predetermined tasks and the influences excised on nearby fisheries by large noise, intense flash light or the like which accompany launching. However, in the United States of America, a number of serious failures of launching have been reported. In particular, in the case of the failure of launching of a Titan rocket at the base of the United States Air Force in Vandenberg in California, Spring, 1986, Aerodin—a deadly poisonous propellant—was scattered by explosion to destroy natural environments over a vast area, and seriously adversely affected the neighboring fauna and flora. For the above and other reasons, California and the United States of America gave effect to extremely strict and complicated laws and regulations concerning atmospheric pollution, explosives and combustibles, water resources, noise, and influences on the fauna and flora. As is reported, regarding the next generation large space rocket "Advanced Launch System . . . ALS" which is being developed primarily by the United States Air Force at the Vandenberg air force base, land-based launching has been abandoned and ocean-based launching is under consideration. To cope with these problems, the present inventor has previously acquired U S. Pat. No. 4,747,334, entitled "OCEAN LAUNCHING APPARATUS OF SPACE ROCKET".

However, the invention of the prior application has a number of problems. For example, the prior invention utilizes a method including: accommodating a space-rocket launcher into a large exclusive ship such as a floating dock which floats in a semi-submerged state on the ocean; and causing the exclusive ship to float up to hold the launcher for carrying purposes. As a result, even if the scale of the above ocean launcher is reduced for the purpose of launching small rockets, it is difficult to substantially reduce the undue costs and expenses of the apparatus itself. Also, when a semi-submersible type of launcher for space rockets is to be carried on the ocean, the following three methods have heretofore been selectively available. The first method is called wet tow in which a space-rocket launcher is towed on the ocean; the second method utilizes a submersible barge such as that disclosed in U.S. Pat. No. 4,747,334; and the third method is called dry tow in which a space-rocket launcher is loaded on a heavy-cargo carrier capable of similar float on/off operations. If a space-rocket launcher is to be carried by the wet tow method, limitations are imposed to the transportation of a space rocket, a launch control room and associated facilities such as accommodations to a launching site and the launch operation of preparing and launching a space rocket at the launching site. Ships for dry-tow purposes are generally costly and, each time the space-rocket launcher is loaded and unloaded by a float on/float off method, the deck of the barge or the carrier is submerged. Accordingly, a rocket hangar and the facilities and equipment required to proceed a series of launching operations cannot be installed directly on the deck, and a ship for carrying these facilities must be separately prepared. Otherwise, the facilities and equipment must be constructed as complicated float structures so that they can be loaded and unloaded together with the space-rocket launcher in a float on/float off method. This leads to an increase in the total running cost of the rocket launcher.

SUMMARY OF THE INVENTION

It is therefore an object of the present invention to provide a movable ocean launching apparatus for launching space rockets inexpensively and smoothly by proceeding through a series of operations comprising the steps of: carrying an ocean launcher, preparing for the launching of a space rocket on the ocean, and completing the launching of the space rocket.

To achieve the above object, according to the present invention, there is provided a movable ocean launching apparatus, which comprises: an ocean launcher including a supporting frame having a launch pad for launching a space rocket on its upper face, a strut fixed to each of opposite sides of the supporting deck and formed to extend downward, and a submersible lower hull fixed to the lower end of each of the struts; and a carrier having on its upper deck at least one base for supporting the supporting deck of the ocean launcher and being arranged to carry the ocean launcher while holding the ocean launcher on the carrier.

According to the present invention, the ocean launcher for space rockets is held on a carrier in such a manner as to stride the deck of the carrier, and is then carried to the desired ocean area. The ocean launcher is loaded onto the carrier by a process comprising the step of: floating the launcher on the ocean by means of its lower hulls or otherwise floating the carrier in a semi-submerged state; moving the carrier into the space between the lower hulls of the launcher; positioning the upper supporting deck of the launcher above the bases of the carrier; reducing the buoyancy of the lower hulls to move the launcher downward or the carrier is floated up, thereby holding the supporting frame of the launcher on the bases of the carrier; and fixing the launcher to the carrier by its own weight or loaded in this state, is carried to the desired ocean as described previously. In the above arrangement and construction, it is only necessary that the carrier be provided with the bases for supporting the launcher. In addition, the launcher has a structure which is so formed as to stride the carrier and which can float up and down in itself. A large exclusive ship such as a floating deck is not required to carry the launcher and therefore, an inexpensively available ship can be utilized as a carrier.

In accordance with the present invention having the above arrangement and construction, even if an expensive float on/float off type of exclusive carrier is not prepared, an inexpensively available flat deck type of ship can be utilized as a carrier for a large ocean launcher to construct a movable ocean launching base of the type which uses an ocean launcher. Accordingly, it is possible to inexpensively realize the transportation of the ocean launcher and preparation for ocean-based launching. In consequence, the total construction costs of the base can be reduced and it is possible to achieve an ocean launching system particularly convenient to launch a relative small rocket.

The above and other objects, features and advantages of the present invention will be apparent from the following description of a preferred embodiment of the invention with reference to the accompanying drawings.

BRIEF DESCRIPTION OF THE DRAWINGS

FIG. 3 is a schematic perspective view showing the ocean launcher which floats in a semi-submerged state at a launching location with a launch-pad service tower open;

FIGS. 6, 7, 8 and 9 are schematic views which serve to illustrate the process of loading the ocean launcher on the mother ship.

DESCRIPTION OF THE PREFERRED EMBODIMENT

A preferred embodiment of the present invention will be explained in detail below with reference to the accompanying drawings.

Figure 1:
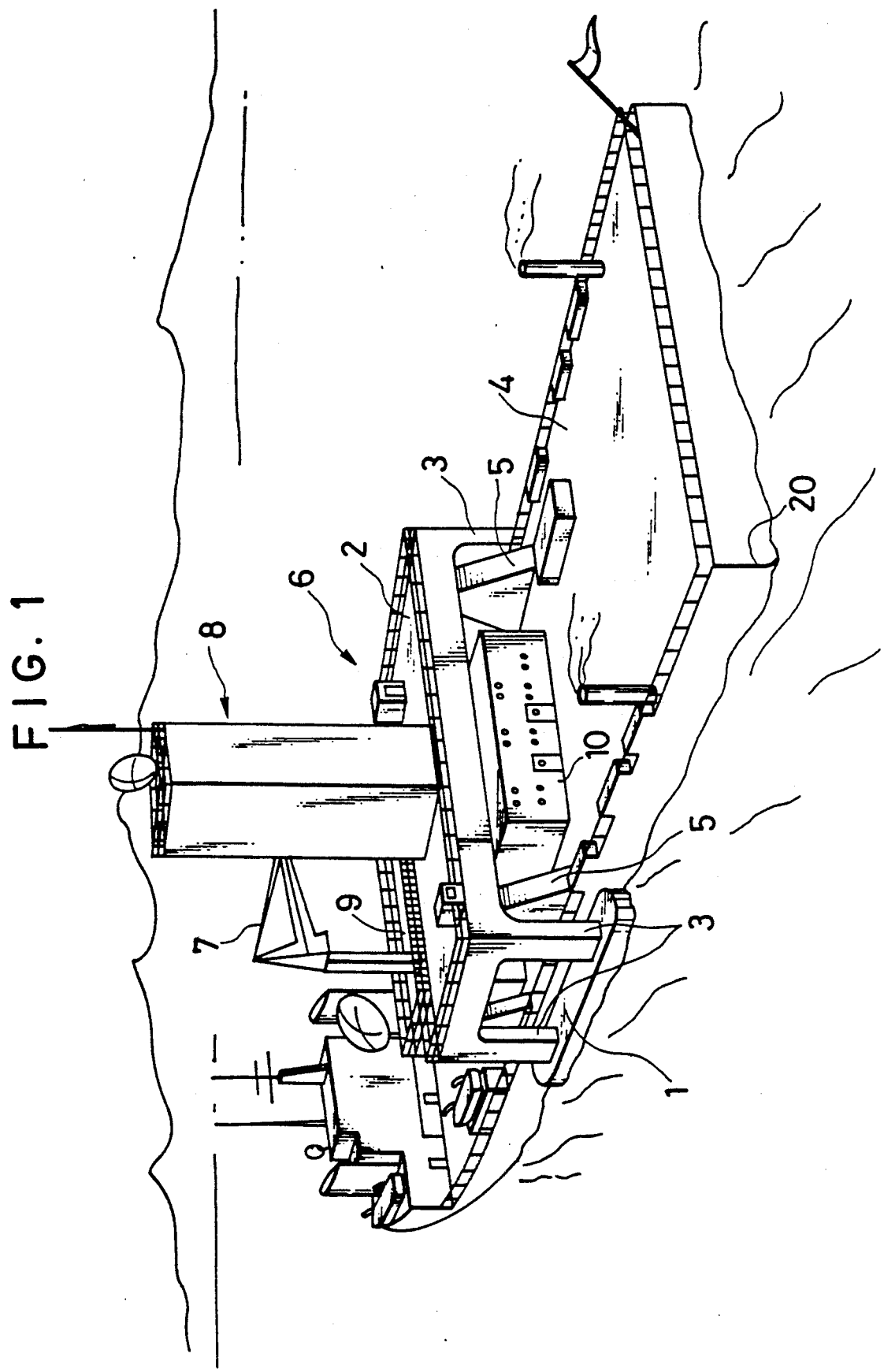
FIG. 1 is a schematic perspective view showing a carrier or mother ship which is on voyage while carrying a ocean launcher for space rockets.
Figure 2:
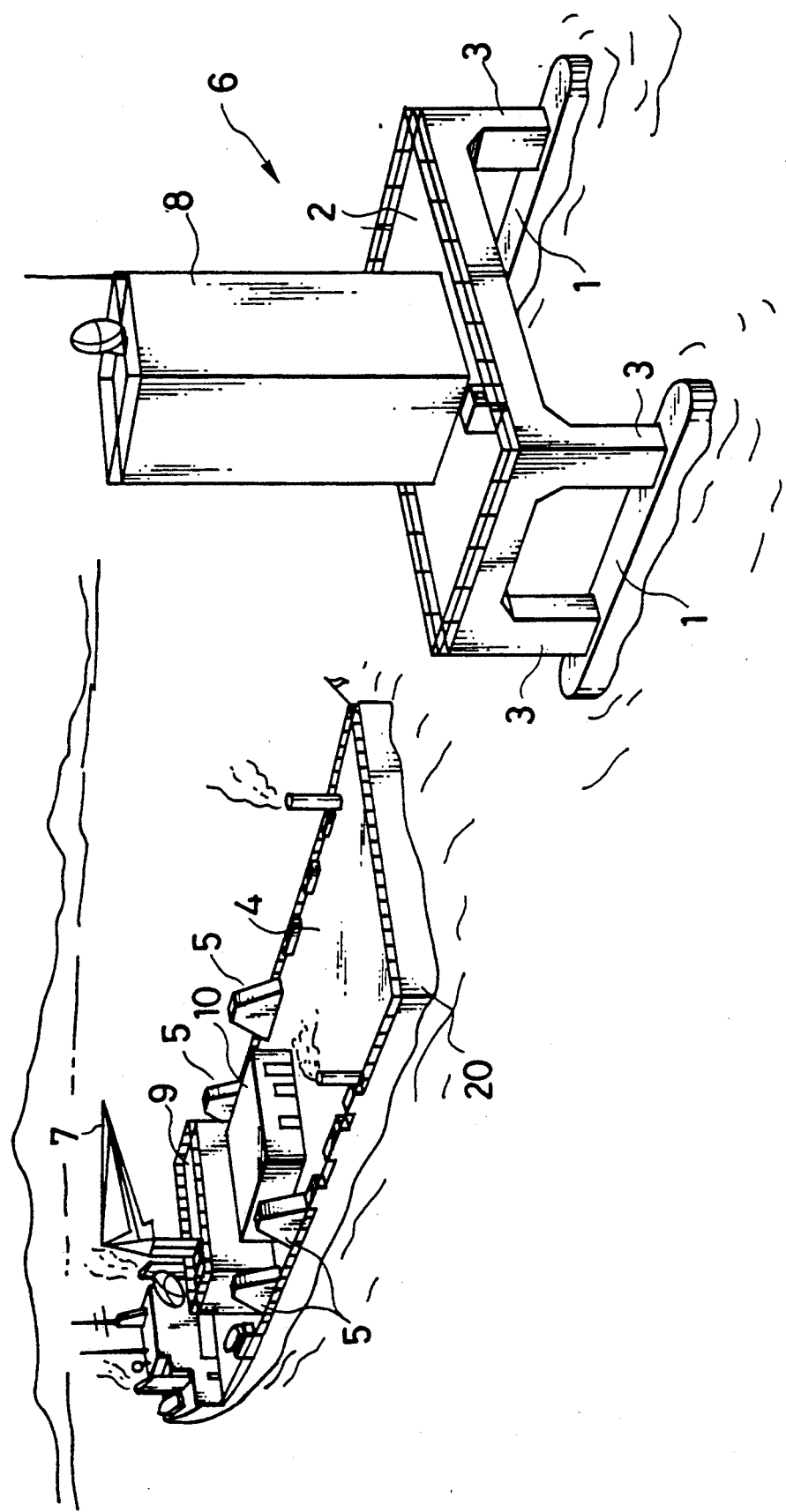
FIG. 2 is a view similar to FIG. 1, but showing the state of the ocean launcher being separated from the mother ship which lies at anchor.
Figure 4:
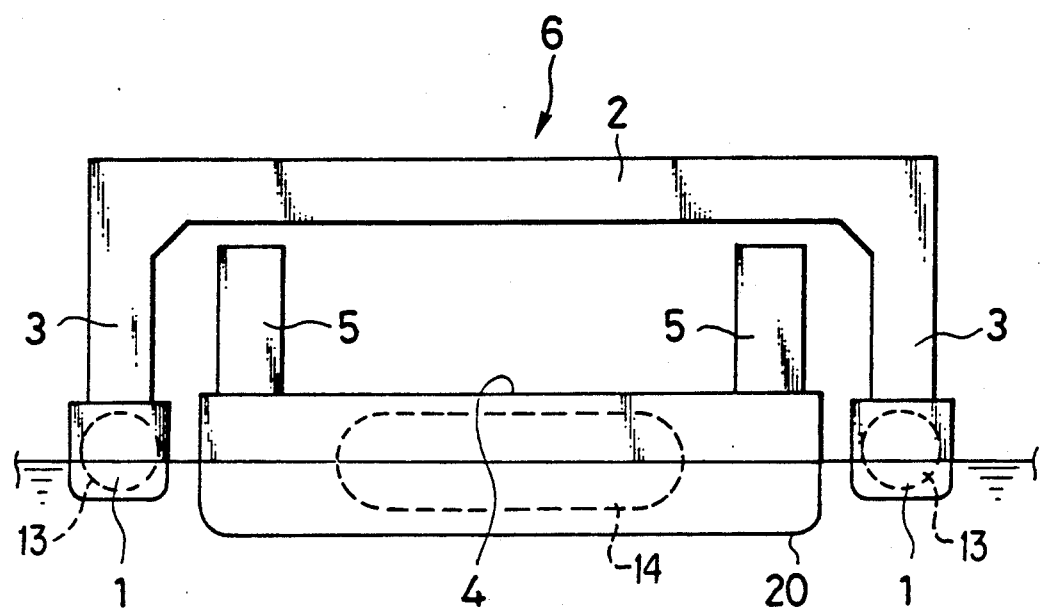
FIGS. 4 and 5 are schematic cross-sectional views showing the ocean launcher and the mother ship, respectively, before and after the former is loaded on the latter.
Figure 5:
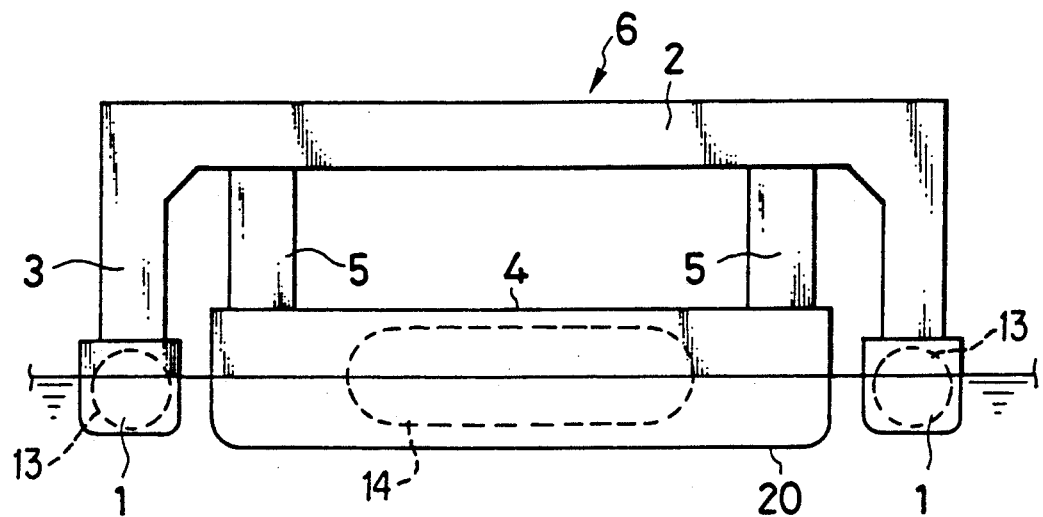
Figure 8:
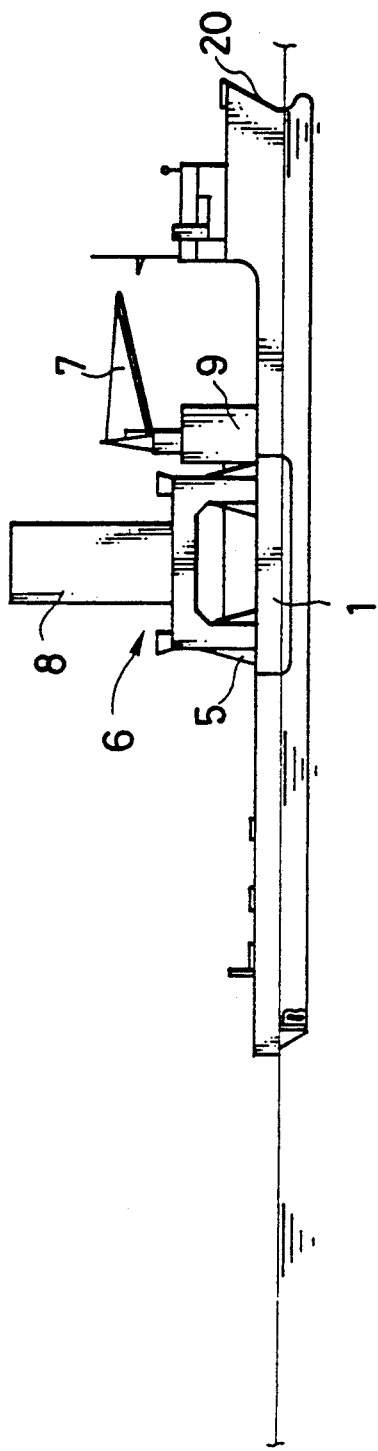
Figure 9:
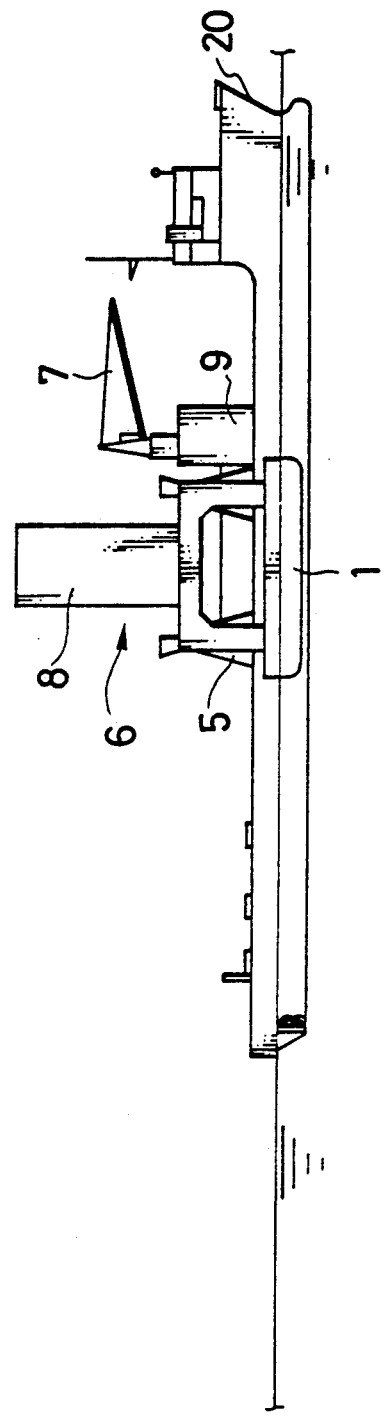

FIG. 1 is a schematic perspective view showing a carrier 20 which is on voyage with a semi-submergible ocean launcher for space rockets supported on bases 5. FIG. 2 is a view similar to FIG. 1, but showing the state of the ocean launcher being separated from the carrier 20 which lies at anchor. FIG. 3 is a schematic perspective view showing the ocean launcher which floats in a semi-submerged state at a launching location with a launch-pad inspecting tower open. FIGS. 4 and 5 are schematic cross-sectional views showing the ocean launcher and the carrier, respectively, before and after the former is loaded on the latter. FIGS. 6 to 9 are schematic views which serve to illustrate the process of loading the ocean launcher on the carrier.

The ocean launcher 6 for space rockets according to the present invention comprises, as shown in FIGS. 2 and 3, a pair of elongated cylindrical lower hulls 1 which are spaced part from each other in the direction approximately perpendicular to the direction of movement. The lower hulls 1 are arranged to discharge ballast water from ballast tanks in a submerged state and cooperate to produce buoyancy. Each of the lower hulls 1 has a vessel-like shape, that is, a streamline shape extending in the direction of movement, and may be provided with an arbitrary cross-sectional configuration, whether square or round. The ocean launcher 6 also comprises an upper supporting deck 2, and a launch pad 2', an umbilical tower 11, and a launch-pad service tower 8 which serves as a shell for protecting the rocket 12 to be launched from natural phenomenon such as waves, wind and rain. The other facilities and equipment required for launching operations are loaded on the upper supporting deck 2. The upper supporting deck 2 is securely mounted on the aforesaid lower hulls 1 by means of at least one web-shaped or columnar strut 3 which is provided on each of opposite sides of the upper supporting frame 2. It is preferable that the strut 3 have the smallest possible horizontal cross section. Accordingly, the ocean launcher 6 is a semi-submersible type of saddle-shaped structure.

As shown in FIG. 1, the ocean launcher 6 is normally loaded on the bases 5 in such a manner as to stride the flat deck 4 of a ship having a width narrower than the space between the pair of lower hulls 1. The ship may be a self-propulsion or non-self-propulsion type of flat deck barge, a flat-deck type carrier for heavy cargoes, or a carrier (mother ship) utilizing a similar ship.

When the ocean launcher 6 is to be loaded onto the mother ship, the ocean launcher 6 is floated with a shallow draft by, for example, discharging ballast water from water ballasts tanks. Otherwise, the draft the mother ship may be made deep by charging water into the water ballasts tanks 14. In this manner, the ocean launcher 6 is positioned in such a manner that the bottom face of the upper supporting deck 2 does not collide with the bases 5 or any other obstacles disposed on the flat deck of the mother ship (refer to FIG. 6). Then, the mother ship is moved to insert the flat deck 4 into a position below the upper supporting frames 2 of the ocean launcher 6 (refer to FIG. 7). When the ocean launcher 6 is positioned in vertical alignment with the bases 5, the mother ship is stopped (refer to FIGS. 8 or 4). Then, the upper supporting deck 2 of the ocean launcher 6 is secured to the bases 5, as required, by charging or discharging ballast water into or from the ballast tanks 13 of the ocean launcher 6 and raising or lowering the draft of the mother ship (refer to FIGS. 9 or 5). If the lower hulls 1 of the ocean launcher 6 are each provided with a dynamic positioning system (DPS) 15, the ocean launcher 6 can travel by its own power to be loaded onto the mother ship or carrier 20.

During a voyage, the ocean launcher 6 may float from or come away from the bases 5 due to waves. To prevent such an accident, it is preferable that the mother ship (carrier) 20 and the ocean launcher 6 be integrally secured to each other by charging a sufficient amount of ballast water into the water ballasts tanks 13 of each lower hull 1 of the ocean launcher 6 to apply load to the bases 5 or by mechanically fixing the ocean launcher 6 to the mother ship (or carrier) 20. In addition, to reduce wave-making resistance which is applied to the lower hulls 1 while the ocean launcher 6 is being carried, each the lower hulls 1 may preferably be formed into a streamline or vessel-like shape extending in the direction of movement.

In the presently preferred embodiment, a rocket hangar 9, a launch control room, accommodations and the like may be embarked or disembarked by separately prepared means such as a crane. If such facilities are constructed as modules, they may also be embarked or disembarked not only by using a crane but by means of a roll-on roll-off ship of a suitable type.

When a launching site is reached, a crane 7 or other similar means is activated to take the rocket 12 out of the rocket hangar 9 with the ocean launcher 6 held in position on the mother ship 20; Otherwise, although not shown, another rocket may be transferred from a carrier to the mother ship 20. The rocket 12 or the rocket transferred from the carrier is then sited on the launch pad 2' of the ocean launcher 6. After predetermined preparing activities have been completed, the ocean launcher 6 is removed from the mother ship 20 in the order opposite to the above-described one and is then held at a predetermined launching site (refer to FIG. 3). Subsequently, the rocket 12 is launched under the control of the launch control room disposed on the mother ship 20. The ocean launcher 6, which is provided with a propeller-type DPS 15 also having performance suitable for propulsion purposes, travels to the launching site by its own propulsive force and launch the rocket 12 while holding its own position.

As is apparent from the foregoing, the movable ocean launching apparatus of space rockets according to the present invention is arranged so that a carrier can carry the ocean launcher while holding the upper supporting frame thereof. Accordingly, both the ocean launcher and the carrier can be held in a floating, submerged, or semi-submerged state, whereby it is possible to enjoy the advantage of easily loading the ocean launcher onto the carrier. Needless to say, this advantage can also be realized within the scope and spirit of the present invention which are set forth in the appended claims.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A movable ocean launching apparatus, comprising:
   an ocean launcher including:
   a supporting deck having an upper face and a launch pad on said upper face for launching a space rocket;
   a strut fixed to each of opposite side of said supporting deck and formed to extend downward; and
   a submersible lower hull fixed to the lower end of each of said struts; and
   a carrier having a deck with at least one base for supporting said supporting deck of said ocean launcher and being arranged to be capable of carrying said ocean launcher by holding said ocean launcher on said at least one base of said carrier.

2. A movable ocean launching apparatus according to claim 1, wherein each of said lower hulls has a streamline external configuration extending in the direction of movement thereof.

3. A movable ocean launching apparatus according to claim 1, wherein said deck of said carrier is provided with a space-rocket hangar.

4. A movable ocean launching apparatus according to claim 1, wherein said ocean launcher is provided with a launch-pad service tower.

5. A movable ocean launching apparatus according to claim 1, wherein said carrier has two bases for supporting said supporting deck and accommodations are provided between said bases on said deck of said carrier.

6. A movable ocean launching apparatus according to claim 1, wherein at least one lower hull is provided with a dynamic positioning system.

7. A movable ocean launching apparatus according to claim 1, wherein said lower hulls of said ocean launcher are provided with ballast tanks for receiving and discharging water such that the draft of said ocean launcher may be adjusted when said ocean launcher is floating in water by discharging water from or receiving water into said ballast tanks.

8. A movable ocean launching apparatus, comprising:
   an ocean launcher including:
   a supporting deck having an upper face and a launch pad on said upper face for launching a space rocket;

a strut fixed to each of opposite sides of said upper supporting deck and formed to extend downward; and a pair of lower hulls fixed to said respective struts of said upper supporting deck, said lower hulls being arranged to produce buoyancy in a submerged state; and a variable draft carrier having a deck with at least one base for supporting said upper supporting deck of said ocean launcher and being arranged to be capable of carrying said ocean launcher by holding said ocean launcher on said at least one base of said carrier.

9. A movable ocean launching apparatus according to claim 8, wherein each of said lower hulls has a streamline external configuration extending in the direction of movement thereof.

10. A movable ocean launching apparatus according to claim 8, wherein said deck of said carrier is provided with a space-rocket hangar.

11. A movable ocean launching apparatus according to claim 8, wherein said ocean launcher is provided with a launch-pad service tower.

12. A movable ocean launching apparatus according to claim 8, wherein said carrier has two bases for supporting said supporting deck and accommodations are provided between said bases on said deck of said carrier.

13. A movable ocean launching apparatus according to claim 8, wherein at least one lower hull is provided with a dynamic positioning system.

14. A movable ocean launching apparatus according to claim 8, wherein the carrier is provided with ballast tanks for discharging and receiving water such that the draft of the carrier may be adjusted when said carrier is floating in water by discharging water from or receiving water into said ballast tanks.

15. A movable ocean launching apparatus, comprising:

an ocean launcher including:

an upper supporting deck having an upper face and a launch pad on said upper face for launching a space rocket;

a strut fixed to each of opposite sides of said upper supporting deck and formed to extend downward; and a pair of submersible lower hulls fixed to said respective struts of said upper supporting deck; and a variable draft carrier having a deck with at least one base for supporting said upper supporting deck of said ocean launcher and being arranged to be capable of carrying said ocean launcher by holding said ocean launcher on said at least one base of said carrier.

16. A movable ocean launching apparatus according to claim 15, wherein each of said lower hulls has a streamline external configuration extending in the direction of movement thereof.

17. A movable ocean launching apparatus according to claim 15, wherein said deck of said carrier is provided with a space-rocket hangar.

18. A movable ocean launching apparatus according to claim 15, wherein said ocean launcher is provided with a launch-pad service tower.

19. A movable ocean launching apparatus according to claim 15, wherein said carrier has two bases for supporting said supporting deck and accommodations are provided between said bases on said deck of said carrier.

20. A movable ocean launching apparatus according to claim 15, wherein at least one lower hull is provided with a dynamic positioning system.

21. A movable ocean launching apparatus according to claim 15, wherein the lower hulls of said ocean launcher are provided with ballast tanks for receiving and discharging water such that the draft of said ocean launcher may be adjusted when said ocean launcher is floating in water by discharging water from or charging water into said ballast tanks; and wherein the carrier is provided with ballast tanks for discharging and receiving water such that the draft of the carrier may be adjusted when said carrier is floating in water by discharging water from or receiving water into ballast tanks.

* * * * *